US012654482B2

(12) United States Patent
Martin

(10) Patent No.: US 12,654,482 B2
(45) Date of Patent: Jun. 16, 2026

(54) READER AND PAGE GUIDE

(71) Applicant: Travis Martin, Huntington Station, NY (US)

(72) Inventor: Travis Martin, Huntington Station, NY (US)

( * ) Notice: Subject to any disclaimer, the term of this patent is extended or adjusted under 35 U.S.C. 154(b) by 548 days.

(21) Appl. No.: 18/170,699

(22) Filed: Feb. 17, 2023

(65) Prior Publication Data

US 2023/0286311 A1 Sep. 14, 2023

Related U.S. Application Data

(60) Provisional application No. 63/317,599, filed on Mar. 8, 2022.

(51) Int. Cl.
*B42D 9/00* (2006.01)

(52) U.S. Cl.
CPC .................................... *B42D 9/008* (2013.01)

(58) Field of Classification Search
CPC ...................................................... B42D 9/008
See application file for complete search history.

(56) References Cited

U.S. PATENT DOCUMENTS

| | | | | | | |
|---|---|---|---|---|---|---|
| 128,835 | A | * | 7/1872 | Willson | B42D 9/00 | 281/47 |
| 139,936 | A | * | 6/1873 | Ward et al. | B42D 9/008 | 116/235 |
| 213,981 | A | * | 4/1879 | Dow et al. | B42D 9/00 | 40/352 |
| 759,427 | A | * | 5/1904 | Fairchild | B42D 9/008 | 116/238 |
| 2,530,437 | A | * | 11/1950 | Marks | G09B 21/002 | 40/352 |
| 2,562,479 | A | * | 7/1951 | Spikes | G09B 21/002 | 434/117 |
| 2,699,748 | A | * | 1/1955 | Crawford | B42D 9/008 | 281/42 |
| 2,709,440 | A | * | 5/1955 | Donato | B42F 11/02 | 281/49 |
| 3,324,823 | A | * | 6/1967 | Peters | B42F 21/00 | 281/3.1 |
| 3,386,191 | A | * | 6/1968 | Michel | G09B 21/002 | 434/117 |
| D266,857 | S | * | 11/1982 | Greenlees | D19/91 | |

(Continued)

OTHER PUBLICATIONS

JP-3220682-U; Wakabayashi, "Bookmark-attached Booklet E.g. Book, Has Bookmark Portion That is Formed at Edge of Each Sheet of Paper, by Inserting Cut That is Caused by Leaving Bending Line Parallel to Adjacent End Side From Bending Line" 2019 . (Year: 2019).*

*Primary Examiner* — Kristina M Deherrera
*Assistant Examiner* — Tania Courson
(74) *Attorney, Agent, or Firm* — Brennan, Manna & Diamond, LLC

(57) ABSTRACT

The present invention relates to a reading guide to help mark a place on a text or illustration of a page or sheet. The device features a plurality of pieces including two similar small size supporting pieces and a sliding bar. The sliding bar is releasably attached to the two supporting pieces that are positioned on top edge and bottom edge of a page. The sliding bar has an indicator allowing an individual to slide the indicator to a desired position on the page the reader is currently on.

13 Claims, 8 Drawing Sheets

(56) References Cited

U.S. PATENT DOCUMENTS

| | | | | |
|---|---|---|---|---|
| 4,457,585 | A * | 7/1984 | DuCorday | G02B 27/04 359/441 |
| 4,679,328 | A * | 7/1987 | Saad | B43L 13/041 33/447 |
| 5,337,484 | A * | 8/1994 | Cardon | B43L 13/201 33/41.2 |
| 5,429,444 | A * | 7/1995 | Warwick | B41J 21/18 400/706.1 |
| 5,950,560 | A * | 9/1999 | Block | B42D 9/007 116/201 |
| 6,089,609 | A * | 7/2000 | Denley | B42D 9/00 281/49 |
| 7,717,713 | B2 * | 5/2010 | Wescott | G09B 11/04 434/162 |
| 10,647,149 | B2 * | 5/2020 | Reynolds | B42D 17/00 |
| 12,198,566 | B2 * | 1/2025 | Hodgson | G09B 17/02 |
| 2004/0060499 | A1 * | 4/2004 | Penque, Jr. | E01F 13/028 116/63 P |
| 2006/0168830 | A1 * | 8/2006 | Dallman | B43L 3/001 33/286 |

* cited by examiner

READER AND PAGE GUIDE

CROSS-REFERENCE TO RELATED APPLICATION

The present application claims priority to, and the benefit of, U.S. Provisional Application No. 63/317,599, which was filed on Mar. 8, 2022 and is incorporated herein by reference in its entirety.

FIELD OF THE INVENTION

The present invention relates generally to the field of page guides for assisting a reader in maintaining a place while reading. More specifically, the present invention relates to a novel reader guide for use with different types of reading materials. The invention is positioned or secured to a sheet or page and allows a reader to easily follow reading content or to assist in writing on a sheet, thereby eliminating the loss of focus of important details while reading or writing. An indicator is configured to slide up and down or side to side to identify or point to a portion of the text or place on a page that a reader is currently reading or working on and hence, the device can be used by anyone, including people diagnosed with attention disorders and dyslexia. Accordingly, this disclosure makes specific reference thereto. Nonetheless, it is to be appreciated that aspects of the present invention are also equally applicable to other like applications, devices, and methods of manufacture.

BACKGROUND

By way of background, attention disorders such as attention deficit hyperactivity disorder ("ADHD"), attention deficit disorder ("ADD"), and dyslexia are different disorders which can lead to persistent periods of inattention, hyperactivity and/or impulsivity. In fact, about 3 in 10 people with dyslexia also have some form of ADHD or similar disorder. Dyslexia is a learning disorder that makes it hard for people to process written and spoken language. People with dyslexia tend to take longer to sound out words written on a page. ADHD may slow reading speed, in addition to causing difficulty in staying focused on the particular task at hand. Commonly, many individuals love to read but have difficulty staying focused on the content or where they may have left off before they become distracted.

To mark a page while reading or working on a book, magazine, periodical or any other reading material, readers typically fold the page on which they left off, but continuously folding pages may result in defacing reading materials and make others less likely to want to read or use the material. Many readers use physical bookmarks to avoid folding the pages and to hold their place in the book. However, physical bookmarks can be unintentionally misplaced or fall out of a book or reading material if the users hold the reading material by the binding or if the reading material falls down leading to the individual losing track of the page the bookmark was used to track.

Currently available methods for marking a page and guiding readers and reviewers are ineffective and can obstruct the individual from reading or writing on a page. Further, conventional devices for marking a page generally do not indicate what line or paragraph the reader is currently on as the bookmark does not remain in position with respect to the line or paragraph on the page. Thus, people suffering from attention-based disorders such as ADHD, ADD, and dyslexia and also, people who find it difficult to focus and keep track of reading or reviewing progress often lose track of where they are reading and ultimately lose interest in reading or working on the piece or material. Therefore, people desire an improved and simple device that helps mark one's place while reading or working on a paper, book, magazine, article, map, or any other materials.

Therefore, there exists a long-felt need in the art for a device that easily secures to a page or sheet of material. There is also a long-felt need in the art for a reading or illustration guide that allows a reader to easily follow his or her progress on the material's page. Additionally, there is a long-felt need in the art for a reading or writing guide that can be used by people suffering from an attention disorder such as ADD and ADHD or dyslexia. Moreover, there is a long-felt need in the art for a device that also functions as a reading or illustration guide on a page or sheet for a reader, illustrator, writer or other individual working on the sheet or page. Further, there is a long-felt need in the art for an improved reading or reviewing guide that eliminates the requirement of folding a page/paper for indicating where the individual left off. Furthermore, there is a long-felt need in the art for reading guide that eliminates the requirements of using conventional bookmarks with reading and other materials. There is a long-felt need in the art for a reading guide that provides a sliding or movable indicator to allow a reader or other individual to easily follow reading content or engaging in other activity. Finally, there is a long-felt need in the art for a device that does not obstruct reading or use of the page and eliminates loss of focus causing important details to be missed while reading.

The subject matter disclosed and claimed herein, in one embodiment thereof, comprises a reading guide for reading, reviewing, illustrating, or writing materials. The invention functions as a page or sheet guide configured to be easily repositioned along the page or sheet of text or material to help a reader keep track of progress on the text or sheet. The guide further includes a plurality of pieces of transparent plastic, and in one embodiment, three pieces of material with two substantially similar attachment pieces, the longest piece positioned across a top edge and a bottom edge of a page and the substantially similar attachment pieces are separately and independently positioned on the top edge and bottom edge of the page respectively. The longest piece has an attached indicator or guide in the form of an arrow or a point in the middle and configured to slide or move up and down along the length of the longest piece for allowing an individual to position the indicator on a line, area, or paragraph the reader or user is currently on. The longest piece can slide left and right on the page along sliding channels provided by the other two pieces allowing the reader to position on a specific word within a single line or area on the page.

In this manner, the reading material guide of the present invention accomplishes all of the foregoing objectives and provides individuals with a simple device that secures to a book page or sheet and allows a reader to easily follow reading or other content. The sliding indicator allows the reader to focus on the material and not lose important details. The invention can also be used by anyone suffering with attention disorders or others that may find the use of such a guide beneficial while reading, reviewing, illustrating, or engaged in other activities for a paper, book, magazine, article, map, or any other reading materials.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a guide for use with reading, scholarly and other materials. The guide is designed to function as a guide configured to be easily repositioned along the page of text or sheet of material to help a reader or other individual keep track of progress within the text or on the sheet. The guide further includes a plurality of pieces of transparent plastic, with the first or longest piece positioned across a top edge and a bottom edge of a page or sheet, the other two pieces are separately and independently positioned on the top edge and bottom edge respectively at a different spot than the first piece. The first or longest piece, has an attached indicator that is configured to slide or move up and down along the length of the first or longest piece, to allow an individual to position the indicator on a particular spot such as a line or paragraph the individual is currently on. The first or longest piece, can slide or move left and right on the page along sliding channels provided by the additional two pieces allowing the individual to position the indicator on a specific spot in an illustration or word within a single line on the page. The invention is designed to be used by anyone such as and including, students, teachers, special educational aids/devices, scholars, drafters, truck drivers, carpenters, those diagnosed with attention disorders, those diagnosed with dyslexia, and others that may just simply lose their place while reading or working on a paper, book, magazine, article, map, or any other material.

In yet another embodiment, a reading material physical mark device is disclosed. The invention features an elongated slender and transparent plastic piece having two opposite ends, first and second supporting members releasably attached to each end of a page or sheet such as with a book or other material, an indicator slidably positioned on the plastic piece, such that the indicator is configured to slide up and down along length of the plastic piece to indicate a spot on an illustration or text on page with which the marking invention is used. The plastic piece or element is configured to slide transversely to the page for indicating, through use of the indicator, a desired text in a specific line of the text. The transparent plastic piece or element does not obstruct or touch the page or sheet.

In yet another embodiment, a method for tracking the progress within an illustration or the text of a page of a reading material is described. The method includes the steps of providing a reading guide, the reading guide having a plurality of elements or pieces, and in one embodiment, three pieces of transparent or translucent material, such as a plastic, that can extend independently and the first or longest piece of the plurality of pieces having a point or indicator that slides or moves up and down along a longitudinal axis while reading, inspecting, or viewing the material to show what spot, line or paragraph the individual is currently focused on. Next, positioning the edge pieces along the top edge and bottom edge of the page or sheet and releasably attaching the first or longest piece to the other two pieces or parts. Next, sliding the pointer or indicator along the length of the first piece for indicating or identifying a spot, a word, or text the individual is currently focused on. Then, sliding the first or longest piece transversely of the page to indicate a spot in an illustration or word in a line of the text and turning the page to the subsequent page without removing the physical marking device.

In a further embodiment, a combination reading assistance guide and a reading material is disclosed. The reading assistance guide is comprised of supporting pieces, an elongated element supported by the supporting pieces, and an indicator movably connected to the elongated element, wherein each of the supporting pieces comprise an anchor on one end and an opening on an opposite end for holding the elongated element.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
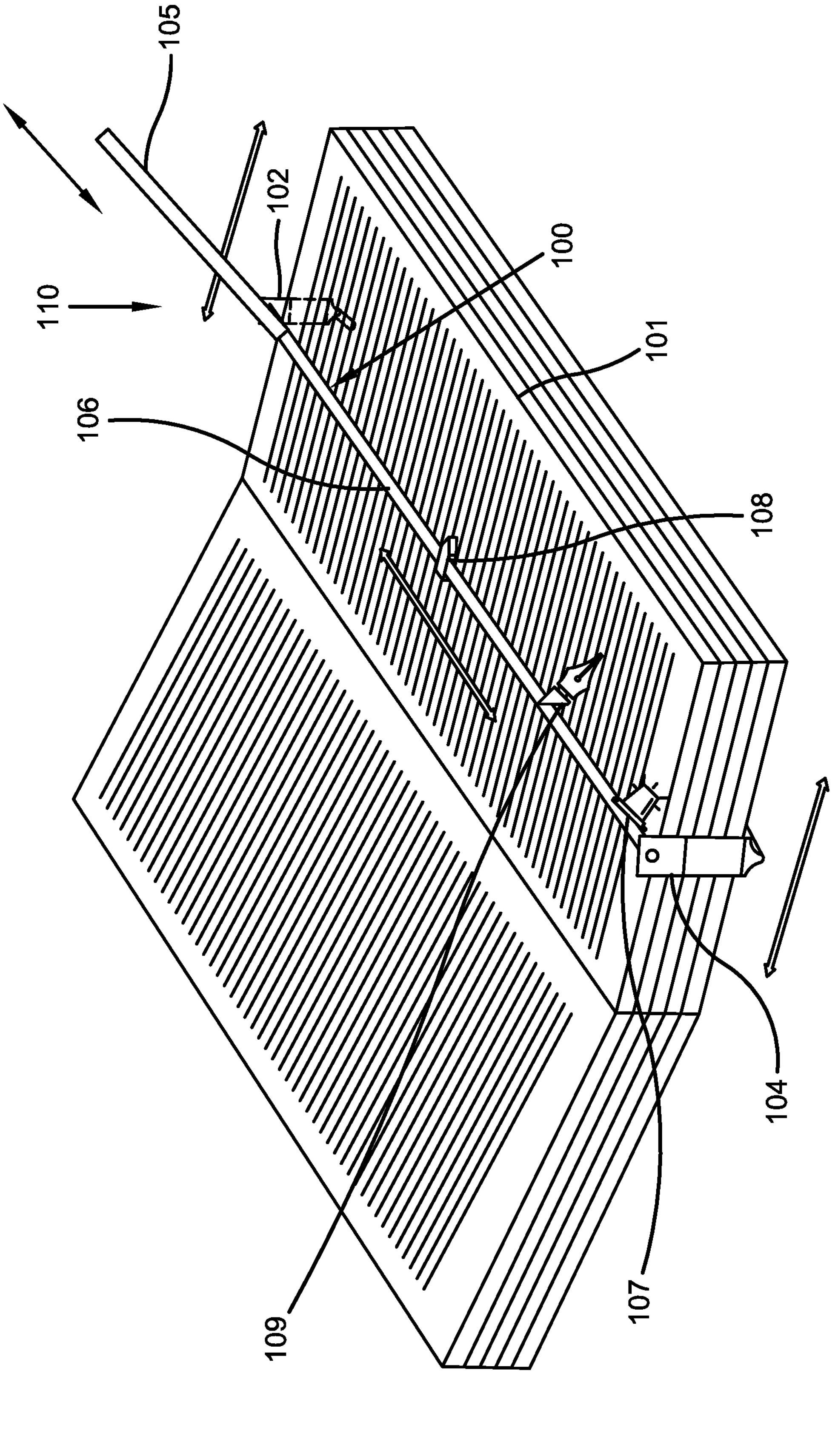
FIG. 1 illustrates a perspective view of one potential embodiment of the reading guide of the present invention in accordance with the disclosed specification.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that easily secures to a page of a book, magazine, periodical, or other material to be reviewed, read, or illustrated. There is also a long-felt need in the art for a reading guide and marker that allows a reader or reviewer to easily follow reading or reviewing progress on a material's page. Additionally, there is a long-felt need in the art for a reading and marking guide that can be used by people suffering from attention disorders or those simply wanting a reading or marking assistance. Moreover, there is a long-felt need in the art for a device that also functions as a reading guide to facilitate reading or reviewing information on a page. Further, there is a long-felt need in the art for an improved reading and marking guide that eliminates the requirement of folding over a page to indicate where the reader or reviewer left off. Furthermore, there is a long-felt need in the art for reading and marking guide that eliminates the requirement of using a conventional bookmark with the reading materials. There is a long-felt need in the art for a reading and marking guide that provides a sliding or movable indicator to allow a reader or reviewer to easily follow content. Finally, there is a long-felt need in the art for a device that does not obstruct reading or reviewing content and eliminates the loss of focus causing important details to be missed while reading or reviewing.

The present invention, in one exemplary embodiment, a reading material marking device is disclosed. The invention features an elongated, slender and transparent or translucent plastic element having two opposite ends, a supporting member releasably attached to each end of the opposite ends, and an indicator slidably positioned on the plastic device. The indicator is configured to slide or move up and down along the length of the plastic element to indicate a spot on an illustration or text on page with which the marking device is used. The plastic element is configured to slide transversely to the page to indicate through the indicator a desired text in a specific line of the text. The indicator is configured to move longitudinally of the page. The transparent plastic element does not obstruct and touch the text of the page.

Figure 8:
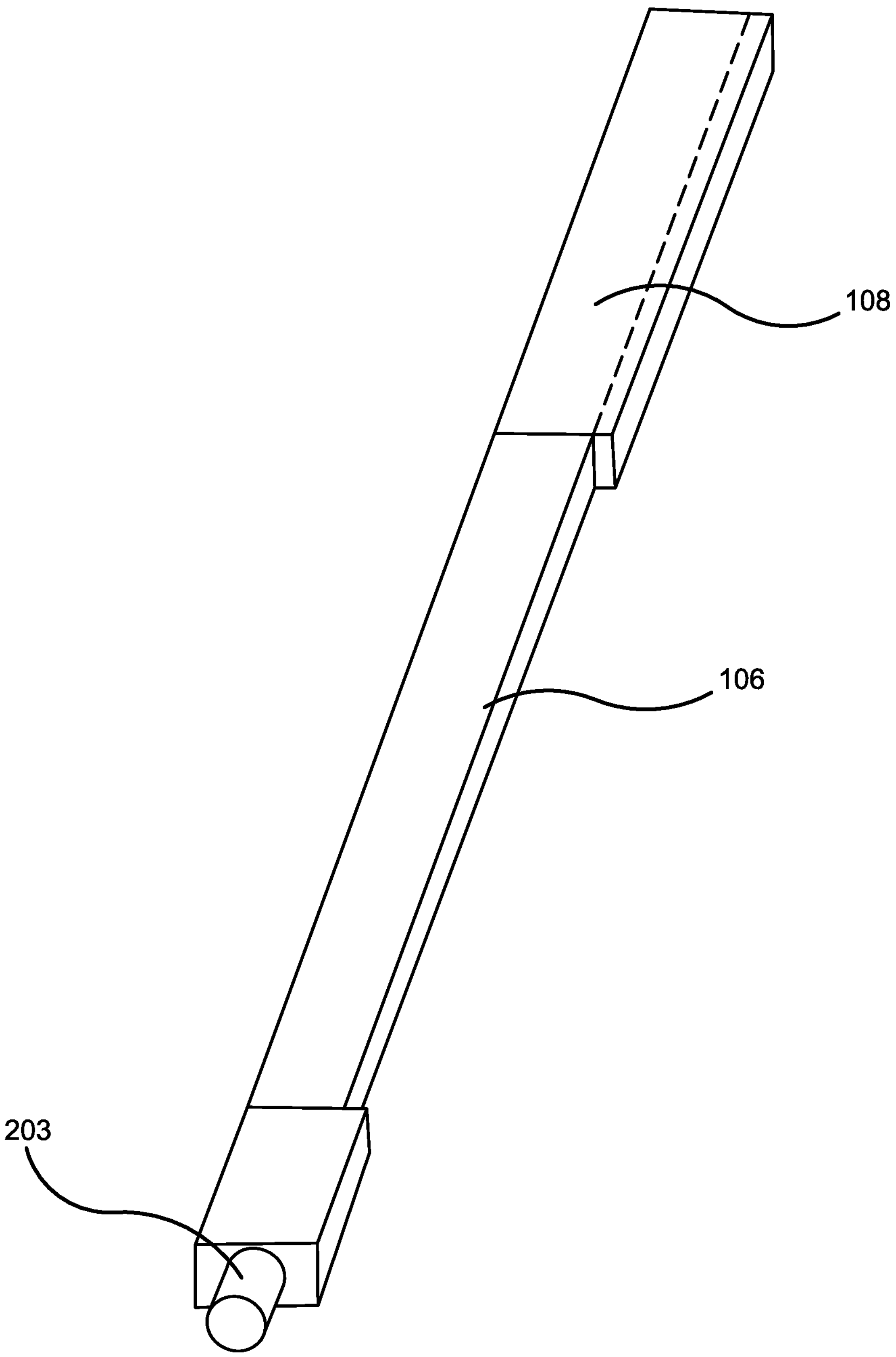
FIG. 8 illustrates a perspective view of one potential embodiment of the reading guide of the present invention in accordance with the disclosed specification.

Referring initially to the drawings, FIG. 1 illustrates a perspective view of one potential embodiment of the reading assistance device of the present invention in accordance with the disclosed specification. The reading assistance guiding device 100 of the present embodiment is designed as an improved marking device for reading and other materials that functions as an assistance guide for helping an individual track the progress of reading or reviewing within an illustration or text on a page of the material. The reader guiding assistance device 100 as shown in the illustration 110 includes three detachable attachment pieces 102, 104, 106 made from substantially transparent or translucent material, such as a plastic. The two small, first and second edge pieces, 102, 104 are configured to attach to at least one page of the material to be reviewed or read such that the first edge piece 102 is positioned along the top edge of the page and the second edge piece 104 is positioned along the bottom edge of the page respectively. An elongated sliding bar 106 is positioned longitudinally over the page of the material and is removably positioned between the first and second edge pieces 102, 104. The sliding bar 106 has an indicator 108 in the form of a pointer, an arrow, or other shape as shown in FIG. 8 and is configured to be slidably positioned on the elongated piece 106, such that the indicator 108 can slide along the sliding bar 106 and point to an area, such as a line of the text on which the individual is focusing. The indicator 108 can slide between the opposite ends of the sliding bar 106, therefore, allowing a reader to point to any area or text on any portion of the page or sheet. The indicator 108 can also function as a magnifying glass. In one embodiment, the sliding bar 106 is comprised of at least one groove 600 that retains the indicator 108 on the sliding bar 106. In one embodiment, the sliding bar 106 is telescopic to accommodate a plurality of book sizes.

The first and second small edge pieces 102, 104 are also configured to slide along the top edge and bottom edge respectively of a page of the reading material such that, upon sliding the attachment pieces 102,104, the sliding bar 106 slides along the width of the page, thereby allowing the reader to point to a specific word or spot within a line of the text. The sliding bar 106 is slender and can have a width from about 5 mm to about 10 mm. Further, the sliding bar 106 can have a length longer than the length of a reading material, thereby allowing the sliding bar 106 to be used with different reading materials. The sliding bar 106 does not obstruct reading of the text of the reading material while providing tracking of progress of reading of a reader. The indicator 108 indicates text of the page at which the reader is currently reading. The sliding bar 106 can have an extensible element 105 which allows the sliding bar 106 to be used in connection with different length pages. The sliding bar 106 may also be provided with a light source 107 which is slidable along the length of the sliding bar 106 to provide additional illumination to the page or sheet 101. Alternatively, the light 107 may be mounted on either or both of the supporting pieces 102 and 104 and/or within the sliding bar 106. A marking pen 109 such as a highlighter, may also be provided on the elongated piece 106 to allow the individual to mark or highlight segments of the text or write additional information on the page or sheet 101.

Figure 2:
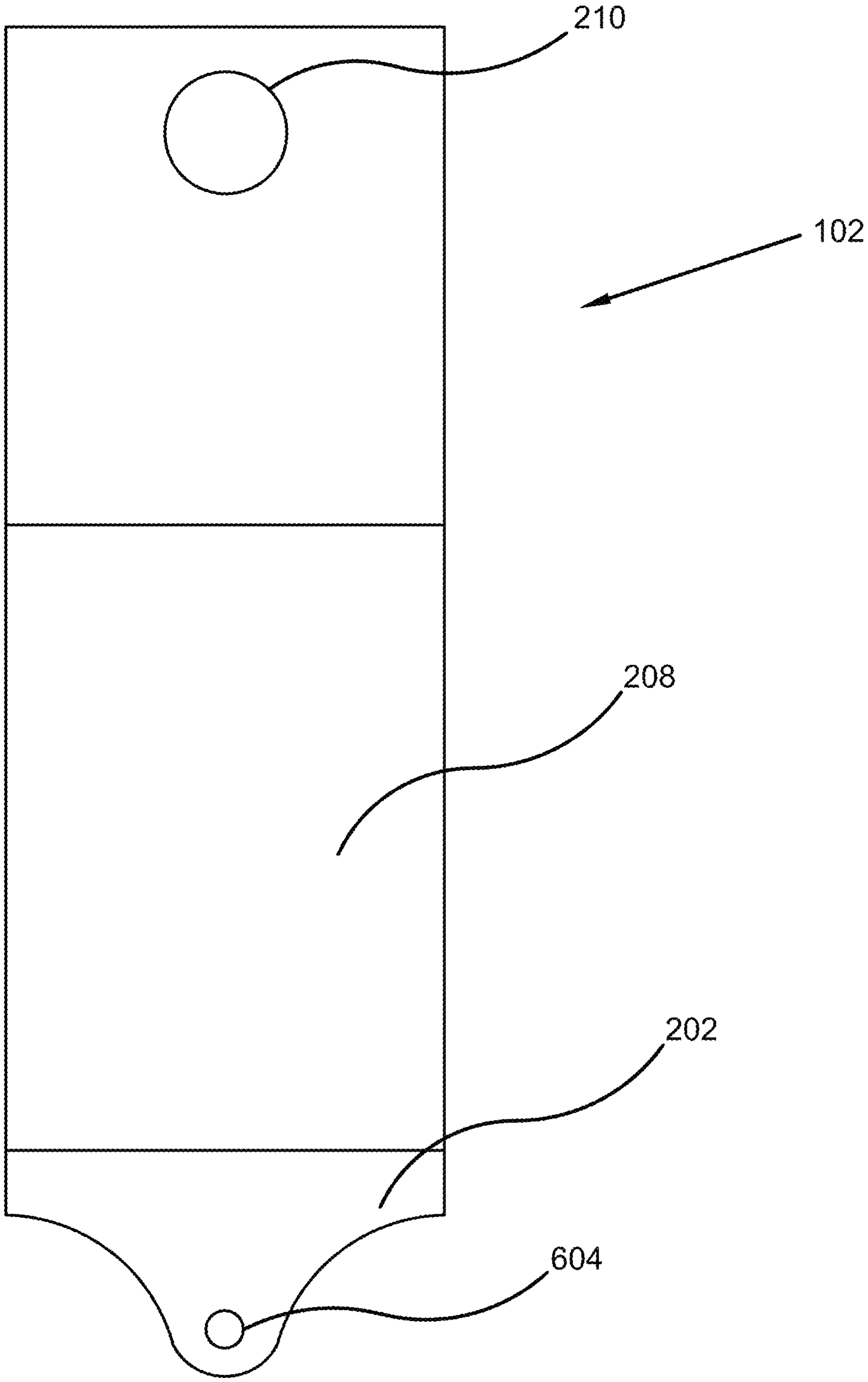
FIG. 2 illustrates a perspective view showing an exemplary attachment piece used in the reading guide of FIG. 1 in accordance with the disclosed description.

FIG. 2 illustrates a perspective view showing an exemplary attachment piece used in the reading guide of FIG. 1 in accordance with the disclosed specification. The attachment piece 102 of the reader guide device 100 has a cover anchor or base 202 for insertion under one or more pages of reading material such that the attachment piece 102 is slidably positioned under the pages. The lower part 204 of the base or cover anchor 202 is positioned below the bottom target page, and the upper part 206 of the cover anchor 202 is positioned on the top target page forming a clamp on the pages to hold the attachment piece 102 in position at the end of the material being read or reviewed.

The attachment piece 102 has an extendable or telescoping arm 208 that can be vertically extended as needed to accommodate a thickness of the material being reviewed or read. The attachment piece 102 has an opening 210 configured to receive one end of the sliding bar 106 of the reader guide 100, such that the sliding bar 106 is supported by a pair of attachment pieces 102, 104 positioned on opposite ends of the reading material. In one embodiment, the opening 210 is circular. The attachment piece 102 shown here is exemplary and the other attachment piece 104 can have the same structure and specifications. In one embodiment, either or both pieces 102,104 are made of substantially transparent plastic, are lightweight, and do not deface or obstruct the reading material. Each of the attachment pieces 102 and 104 may have a locking piece 203 which closes over the U-shape groove or opening 210 to prevent the sliding bar 106 from falling out of the groove. In another embodiment, the locking piece 203 is of a smaller diameter than the sliding bar 106, such that the locking piece 203 fits within the opening 210 of the piece 102 in a removable manner.

Figure 7:
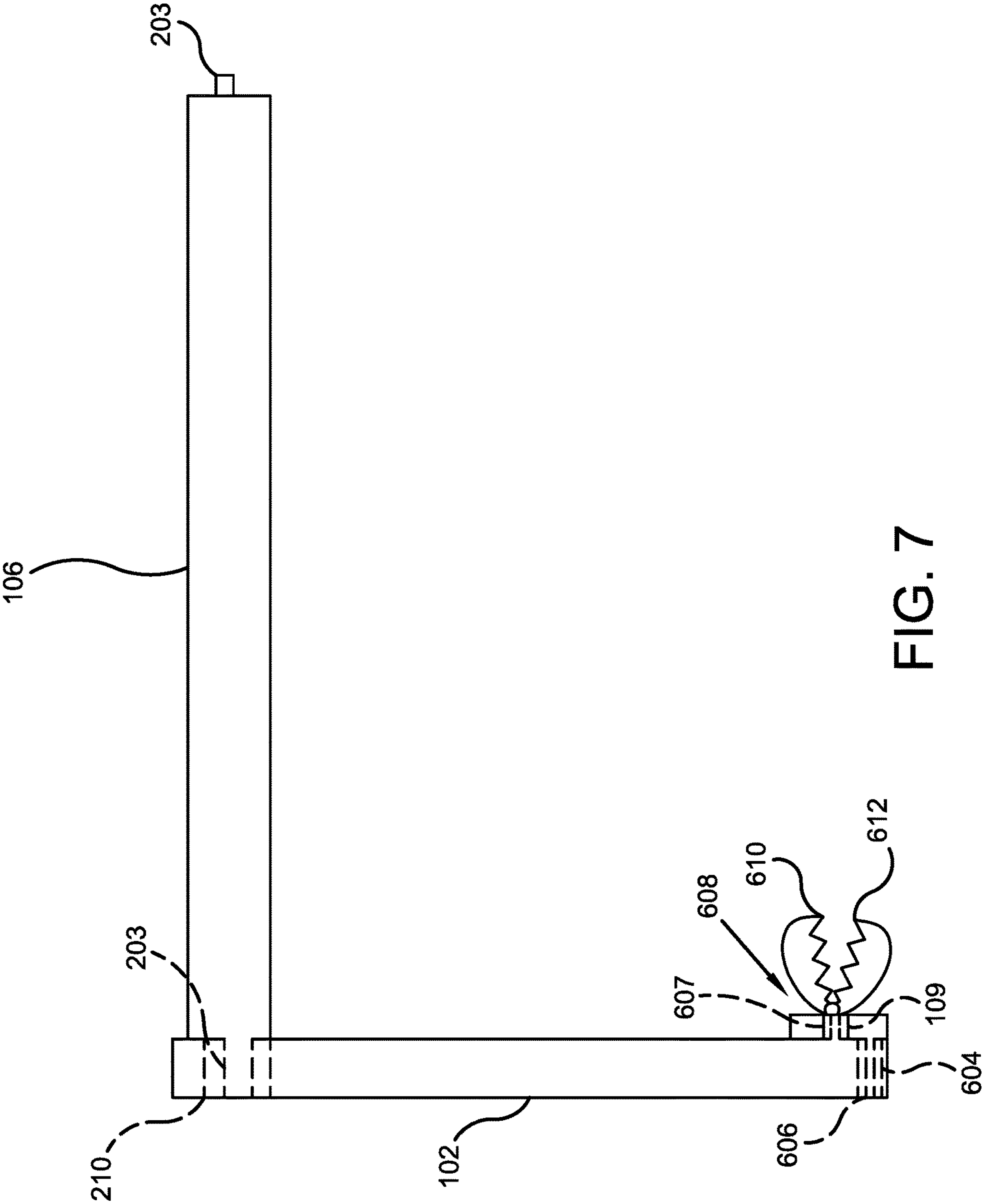
FIG. 7 illustrates a side view of one potential embodiment of the reading guide of the present invention in accordance with the disclosed specification.

An additional embodiment of one piece 102 is shown in FIG. 7. The piece 102 is generally square in shape and is telescopic such that it can be adjusted for various book heights. The piece 102 is comprised of at least one opening 210 that can receive the locking piece 203. The piece 102 also has at least one opening 604 that receives a male member 606 of at least one clip 608 to secure the clip 608 to the piece 102. In addition, the clip 608 may be comprised of at least one opening that receives at least one secondary male member 607 of the piece 102 to further secure the clip 608 to the piece 102. The clip 608 preferably has a first jaw 610 and a second jaw 612 that are expandable, such that the clip 608 can be clipped to various pages of a book to secure the device 100 during use.

Figure 3:
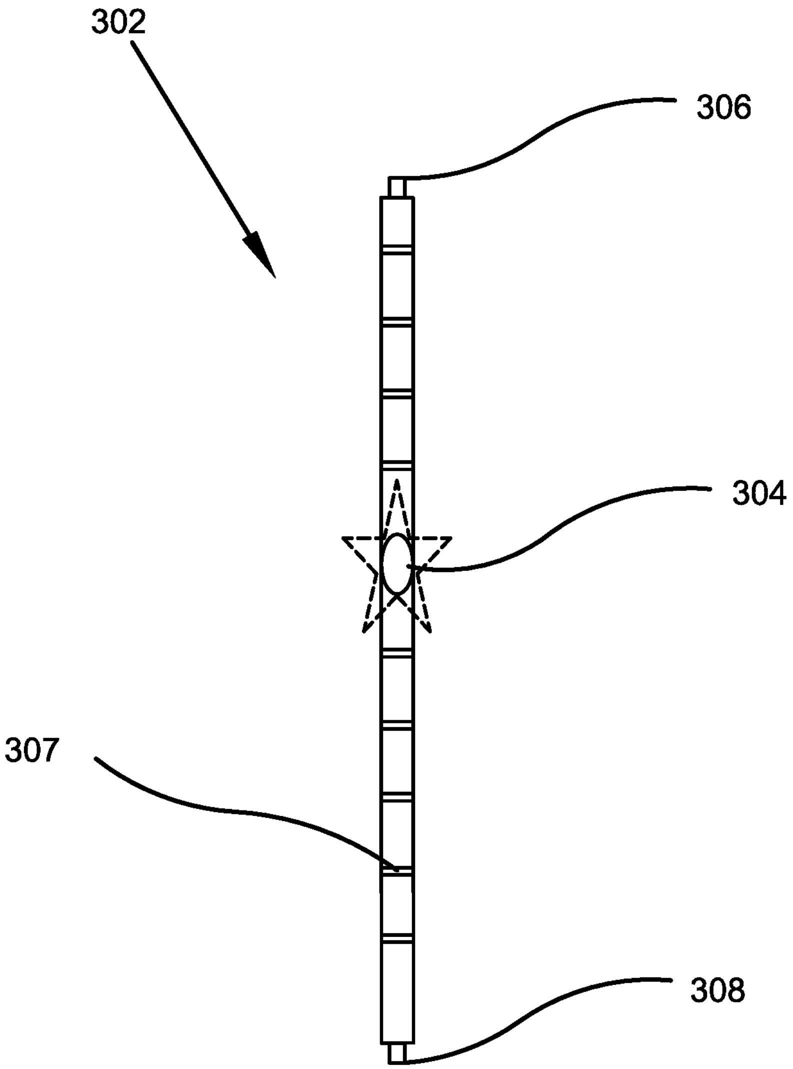
FIG. 3 illustrates a perspective view showing one potential embodiment of the reading guide of the present invention in accordance with the disclosed specification.

FIG. 3 illustrates a perspective view showing one potential embodiment of the reading sliding bar of the present invention in accordance with the disclosed specification. In the present embodiment, the reading guide 302 has a movable point 304 that is configured to slide or move up and down along the length of the reading guide 302. The point 304 is configured to be an indicator to show the spot, line or paragraph the reader is currently reading and can be accordingly pointed to the desired text. The reading guide 302 provides a channel for the point 304 to slide up and down.

The opposite ends of the reading guide 302 have two rounded ends 306, 308 thereby allowing guide 302 to easily engaged and position on the attachment pieces as shown in FIG. 1. The reading guide 302 does not obstruct the reading as the guide 302 is slender and transparent. The reading guide 302 may have a plurality of indentations 307 which moveable point 304 can be locked into so that the moveable point does not inadvertently move from the point that the individual desires to hold their spot on the page or sheet. The indentations 307 may be spaced in equal increments such as ¼' or 1 centimeter. The moveable point 304 can take any shape in order for the user to personalize the invention.

Figure 4:
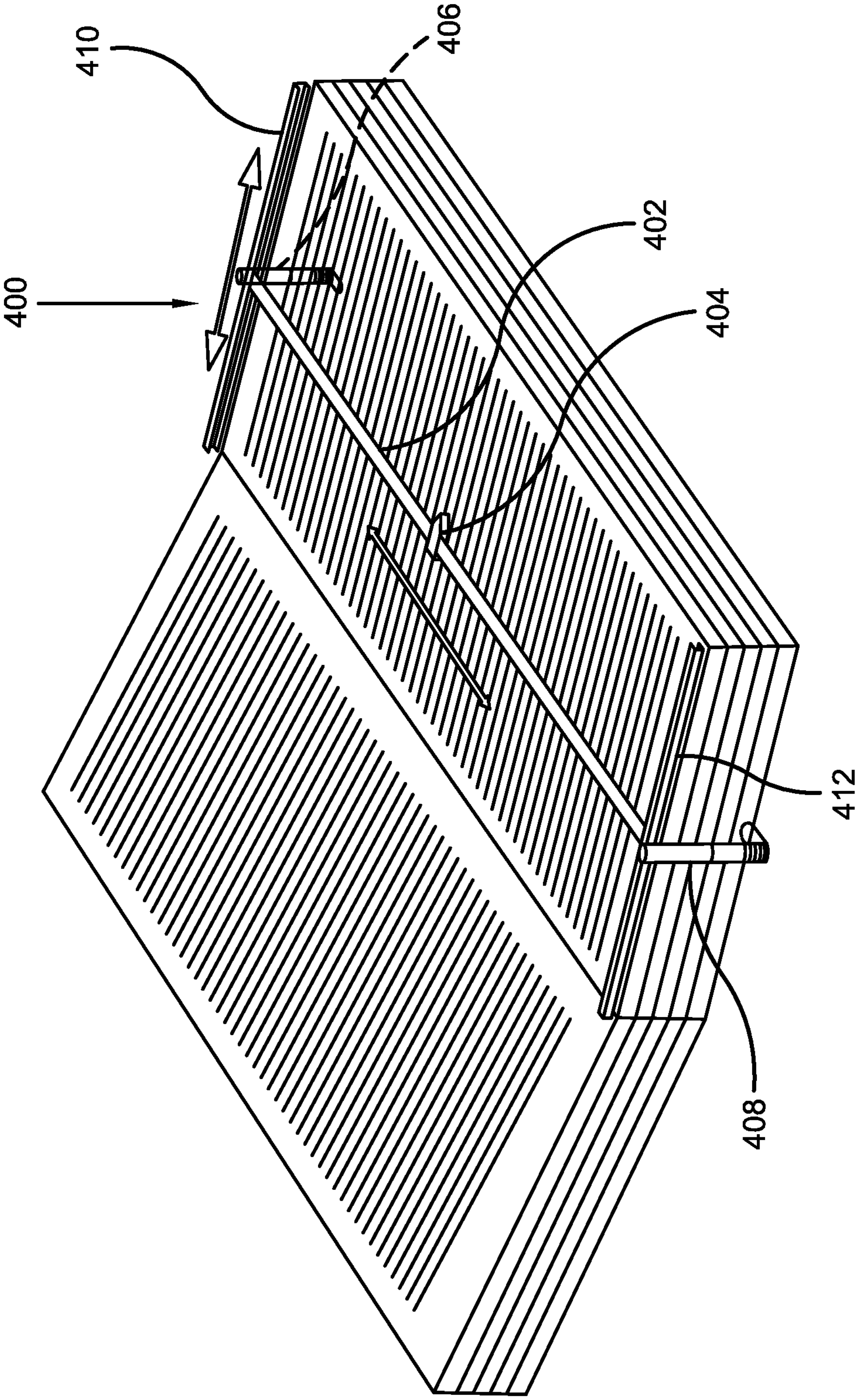
FIG. 4 illustrates a perspective view showing another embodiment of the physical reading guide of the present invention in accordance with the disclosed description.

FIG. 4 illustrates a perspective view showing another embodiment of the reading guide of the present invention in accordance with the disclosed specification. In the present embodiment, the device 400 has a reading sliding bar 402 having a slidably engaged indicator 404 which moves along the length of the sliding bar 402 allowing a reader to position the indicator 404 to a desired spot, such as at a line or word at which the reader is reading.

The sliding bar 402 is releasably attached to the two supporting pieces 406, 408 positioned on the top edge and bottom edge respectively, of one or more pages of the reading material. The supporting pieces 406, 408, having sliding channels or rails 410, 412 along which the sliding bar 402 can slide, allow the reader to point to a specific word at any position on the page of the reading material.

Figure 5:
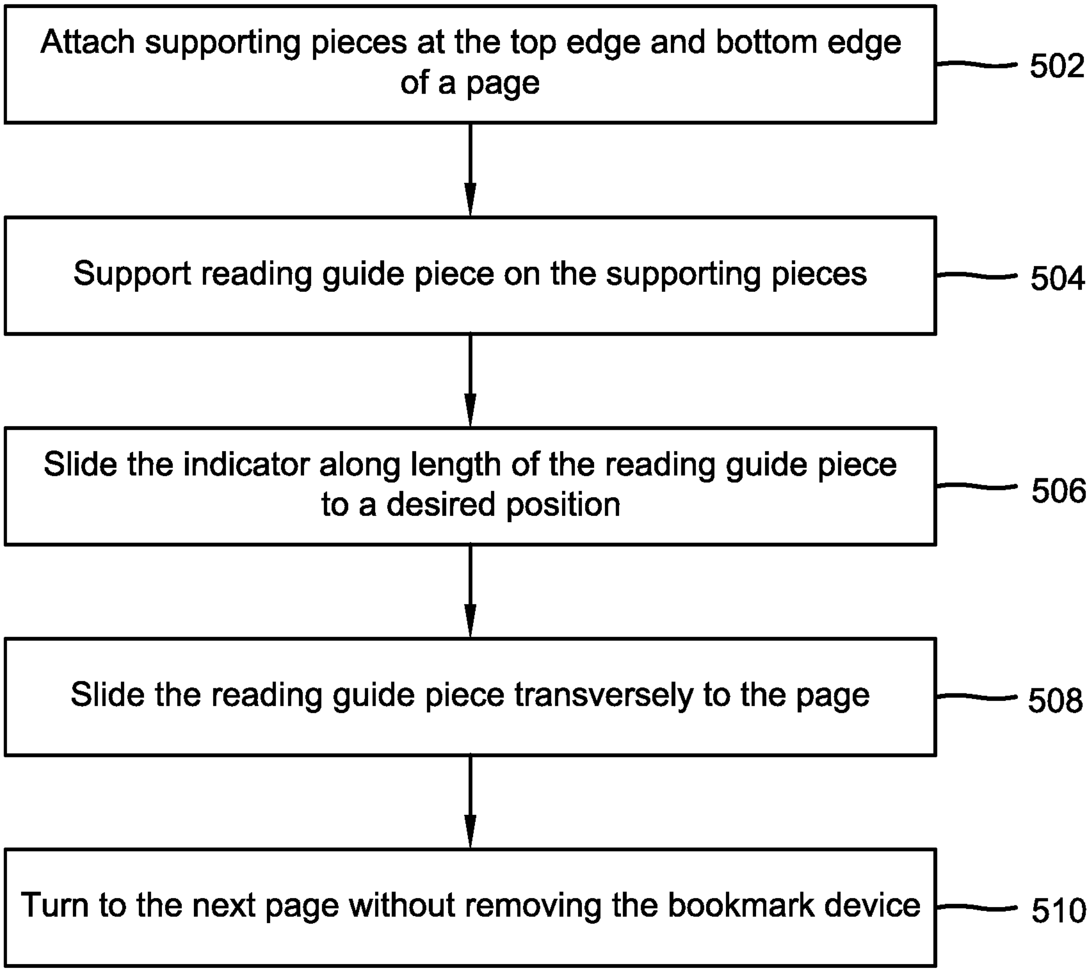
FIG. 5 illustrates a flow diagram illustrating steps performed to use the reading guide of the present invention in accordance with the disclosed specification.

FIG. 5 illustrates a flow diagram illustrating the steps performed to use the reading guide of the present invention in accordance with the disclosed specification. The steps are applicable for different embodiments of the reading guide of the present invention. Initially, the supporting or attachment pieces are attached to the top edge and bottom edge of the pages of the reading material (Step 502). Once, the supporting pieces are positioned, the reading guide is positioned on the supporting pieces to complete the structure of the marking device (Step 504). When a reader starts reading text, the slider or indicator is slid along the length of the reading guide device to a desired position to focus and to remember where the reader left off (Step 506). During reading, the reading guide device is slid transversely allowing the reader to focus on different words positioned in a single line (Step 508). The next page can be turned without removing the bookmark device (Step 510). In some embodiments, the page can be taken from the cover anchor of the guide device.

Figure 6:
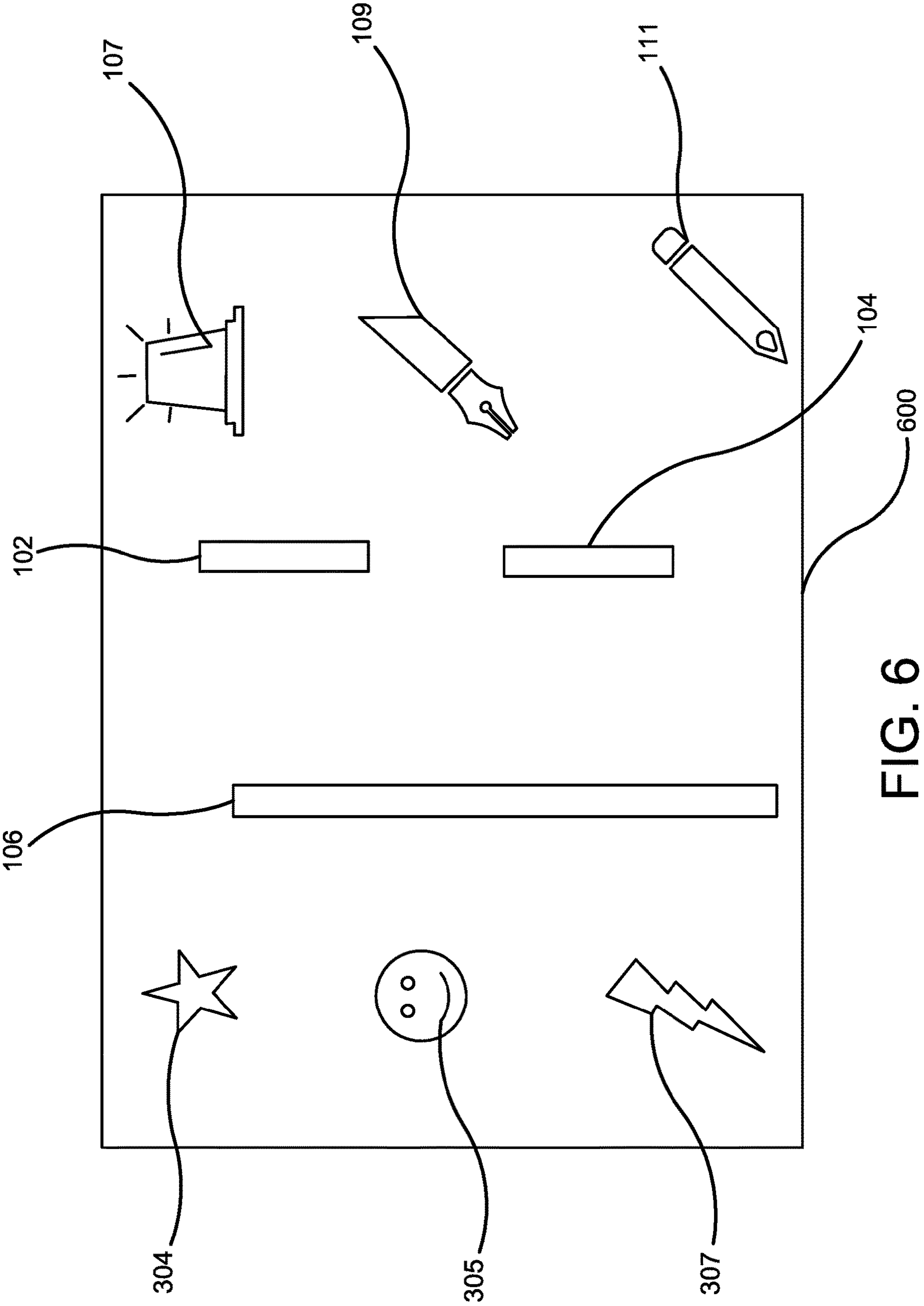
FIG. 6 illustrates a kit showing the various elements used to form one potential embodiment of the reading guide of the present invention in accordance with the disclosed specification.

FIG. 6 shows a kit for providing the reader assistance guide of the present invention and includes a package 600 suitable for one of retail or online sales. The kit 600 includes the elongated element 106 and first and second small supporting arms 102 and 104. The kit 600 includes different types of indicators 304, 305 and 307 which may take any suitable shape. In addition, the kit is also provides a light 107 and marking elements 109 and 111 which may include a highlighter, pen, pencil, or other suitable marker.

The reading guide devices 100, 400 can be used with different reading materials including, but not limited to, paper, book, magazine, article, map, and others. The device 100, 400 allows readers to focus on important details without loss of focus and concentration.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "marking device", "reading assistance guide", "reading material marking device", and "reader guide device" are interchangeable and refer to the reading material guide device 100, 400 of the present invention.

Notwithstanding the foregoing, the reading material guide device 100, 400 of the present invention can be of any suitable size and configuration as is known in the art without affecting the overall concept of the invention, provided that it accomplishes the above-stated objectives. One of ordinary skill in the art will appreciate that the reading material guide device 100,400 as shown in the FIGS. are for illustrative purposes only, and that many other sizes and shapes of the reading material guide device 100, 400 are well within the scope of the present disclosure. Although the dimensions of the reading material guide device 100, 400 are important design parameters for user convenience, the reading material guide device 100, 400 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A marking guide comprising:

a first supporting piece;

a second supporting piece, wherein each of the first and second supporting pieces comprise an anchor and a top portion with an opening;

an elongated piece comprised of a first end and a second end, wherein each of the first and second ends is positioned in the opening of the first and second supporting pieces; and an indicator slidably repositionable along the elongated piece and lockable in place within a plurality of indentations along the elongated piece at a plurality of intervals; and wherein the first and second supporting pieces are configured to clamp to a piece of reading material and the elongated piece lays over the piece of reading material;

wherein the indicator is a magnifying indicator; and further wherein the first and second supporting pieces are telescoping.

2. The marking guide as recited in claim 1, wherein the elongated piece is comprised of an extensible element.

3. The marking guide as recited in claim 1, wherein the elongated piece is comprised of rounded portions on each of the first and second ends.

4. The marking guide as recited in claim 1, wherein the plurality of indentations are spaced apart from one another in equal increments of ¼" or one centimeter.

5. The marking guide as recited in claim 1, wherein the elongated piece is comprised of a width of between 5 mm and 10 mm.

6. The marking guide as recited in claim 1 further comprising a light slidably mounted on the elongated piece.

7. The marking guide as recited in claim 1 further comprising a marking element slidably mounted on the elongated piece.

8. The marking guide as recited in claim 1, wherein each of the first and second supporting pieces is comprised of a locking piece.

9. A combination reading assistance guide and reading material comprising:

a reading material comprised of at least one page;

a reading assistance guide comprised of a pair of supporting pieces and an elongated element supported by the pair of supporting pieces; and an indicator movably connected to the elongated element, wherein each of the pair of supporting pieces comprises an anchor on one end and an opening on an opposite end for supporting the elongated element; and a marking pen movably connected to the elongated element;

wherein the pair of support pieces and the elongated element are transparent; and wherein the first and second supporting pieces are configured to clamp to the reading material and the elongated piece lays over the reading material;

wherein the indicator is a magnifying indicator; and further wherein the elongated element is telescoping and has rounded ends.

10. The combination reading assistance guide and reading material as recited in claim 9 further comprising a light and a marking element slidably mounted on the elongated element.

11. The combination reading assistance guide and reading material as recited in claim 9, wherein the elongated element comprises a plurality of indentations.

12. A kit for making a reading guide, the kit comprising:

a package;

an elongated element comprising a marking element and a highlighter slidably connected to the elongated element;

a first supporting element;

a second supporting element;

a light; and a plurality of indicators, wherein the plurality of indicators are comprised of differing shapes; and wherein the first and second supporting elements are configured to clamp to a piece of reading material and the elongated element lays over the piece of reading material;

wherein the elongated element further comprises an indicator retaining groove; and further wherein the first and second supporting elements each comprise a U-shaped groove and a locking piece for retaining the elongated element in the U-shaped groove.

13. The kit as recited in claim 12 further comprising a marker.

* * * * *